United States Patent [19]

Kazecki et al.

[11] Patent Number: 5,361,400
[45] Date of Patent: Nov. 1, 1994

[54] APPARATUS AND METHOD FOR REMOVING DISTORTION IN A RECEIVED SIGNAL

[75] Inventors: Henry L. Kazecki, Arlington Heights; Steven H. Goode, Barrington; Donald W. Dennis, Schaumburg, all of Ill.

[73] Assignee: Motorola, Inc., Schaumburg, Ill.
[21] Appl. No.: 104,303
[22] Filed: Aug. 9, 1993

Related U.S. Application Data

[63] Continuation of Ser. No. 609,335, Nov. 5, 1990, abandoned.
[51] Int. Cl.$^5$ .................. H04B 15/00; H04B 1/10; H03H 7/30
[52] U.S. Cl. .................................. 455/63; 455/296; 333/18; 375/14; 375/101
[58] Field of Search .................. 455/63, 65, 67.6, 278, 455/296, 305, 307, 137, 52.3; 375/14, 15, 12, 16, 79, 99, 101; 333/18

[56] References Cited

U.S. PATENT DOCUMENTS

| | | | |
|---|---|---|---|
| 3,633,107 | 1/1972 | Brady | 455/137 |
| 4,213,095 | 7/1980 | Falconer | 333/18 |
| 4,281,411 | 7/1981 | Bonn et al. | 455/137 |
| 4,453,256 | 6/1984 | Ryu | 375/15 |
| 4,567,599 | 1/1986 | Mizoguchi | 333/18 |
| 4,615,038 | 9/1986 | Lim et al. | 333/18 |
| 4,800,572 | 1/1989 | Nossek et al. | 375/14 |
| 4,831,637 | 5/1989 | Laurence et al. | 375/15 |
| 5,067,137 | 11/1991 | Kaneko | 375/14 |
| 5,115,452 | 5/1992 | Cupo | 375/14 |
| 5,132,926 | 7/1992 | MacEachern et al. | 375/14 |

OTHER PUBLICATIONS

Principles of Communication Systems, Taub et al.; ©1986, pp. 434–436.
IEEE Transactions On Communications, vol. Com-22, No. 5, May 1974, "Adaptive Maximum-Likelihood Receiver for Carrier-Modulated Data-Transmission Systems", By Gottfried UngerBoeck, describes maximum likelihood sequence estimation in the presence of intersymbol interference.
IEEE Transactions on Acoustics, Speech, and Signal Processing, vol. ASSP. 31, No. 2, Apr. 1983, by John R. Treichler, describes an adaptive digital filtering algorithm that can compensate for both frequency-selective multipath and interference on constant envelope modulated signals. FIG. 2 shows the possible equipment configuration employing the constant modulus approach with an FIR filter. Pg. 465, column 1, paragraph 1, describes a delay of two microseconds.
Vehicular Technology Conference 1990 Records, "A Comparison of Limiter-Discriminator, Delay and Coherent Detection for $\pi/4$ QPSK," by Steven H. Goode, Henry L. Kazecki, and Donald W. Dennis, describes the performance of coherent and non-coherent detectors in Rayleigh and delay spread faded fields.
EIA/TIA Project No. 2215, IS-54, Dec. 1989, Dual-Mode Mobile Station-Base Station Compatibility Standard, describes the delay interval for the equal ray channel model.

*Primary Examiner*—Curtis Kuntz
*Assistant Examiner*—Lisa Charouel
*Attorney, Agent, or Firm*—Kevin D. Kaschke

[57] ABSTRACT

In a receiver an apparatus and method substantially reduces time dispersion and multipath distortion in a received signal. An equalizer (109), including taps having gain coefficients, produces an equalized signal (110) responsive to the received signal (107) and an adaptive process signal (137), wherein the gain coefficients are adjusted responsive to the adaptive process signal (137). A first mixer (111) mixes the equalized signal (110) and a reference carrier signal (115) to produce a recovered modulated signal (119). A detector (112) detects an estimate signal (129) responsive to the recovered modulated signal (119). An error signal generator (139) generates an error signal (141) responsive to a difference between the recovered modulated signal (119) and the estimate signal (129). A second mixer (147) mixes the error signal (141) and the reference carrier signal (115) to produce the adaptive process signal (137). In a preferred embodiment, a third mixer (153) mixes the estimate signal (129) and the reference carrier signal (115) to produce a feedback signal (135) for at least one tap. The present invention advantageously permits the equalizer (109) and the detector (112) to optimally perform their respective functions while coupled together to maximize the receiver's performance.

6 Claims, 3 Drawing Sheets

APPARATUS AND METHOD FOR REMOVING DISTORTION IN A RECEIVED SIGNAL

This is a continuation of copending application Ser. No. 07/609,335, filed on Nov. 5, 1990 now abandoned.

FIELD OF THE INVENTION

The present invention relates generally to radio carrier recovery, and, more particularly, to an apparatus and method for substantially eliminating time dispersion and multipath distortion in a received radio signal.

BACKGROUND OF THE INVENTION

The rapid expansion of the number of cellular radio telephones coupled with the desire to provide additional services has prompted the Telecommunications Industry Association (TIA) to propose a new standard for a U.S. Digital Cellular Network. This standard suggests an increase in system capacity over the current analog system through the use of digital modulation and speech coding techniques. Time division multiple access (TDMA) is used to split the current channel into user slots. The linear modulation technique to transmit the digital information within the channel is $\pi/4$ QPSK (quadrature phase shifted keying).

The use of $\pi/4$ QPSK linear modulation in the U.S. Digital Cellular system provides spectral efficiency allowing the use of 48.6 kbps channel data rates. $\pi/4$ QPSK transmits the data information by encoding consecutive pairs of bits into one of four phase angles ($\pm\pi/4, \pm 3\pi/4$) based upon gray encoding. These angles are then differentially encoded producing an 8 point constellation. Differential encoding makes it possible to detect this modulation through the use of either non-coherent or coherent techniques.

The U.S. Digital Cellular system will operate in the existing 800 MHz band. Radio propagation at these frequencies is characterized by time dispersion distortion. Time dispersion distortion of a received signal occurs when a transmitted signal is received via more than one propagation path each having a different path length. Measured received signals having time dispersion distortion typically have a strong first component and multiple components that are generally lower in amplitude for larger delays. Time dispersion distortion of the received signal is usually found in an environment where a large reflecting source, such as a mountain, is present. A mobile radio in this environment receives the signal from a fixed source transmitter and the delayed signal from the reflecting source. The time delay between the reception of the two signals results in time dispersion distortion. Time dispersion distortion is also known as delay spread distortion. At high data rates (48.6 kbps for example), the time dispersion distortion introduced in the received signal by the channel needs to be considered in the bit error rate (BER) performance evaluation of the various demodulation methods.

The TIA standards committee has recommended a two path equal ray channel model with up to a symbol time delay (41.6 microseconds) interval between the two rays (IS-54, EIA/TIA standard section 2.3.2.1.2). This model significantly departs from the published delay profiles (10 microseconds) for typical urban, suburban, and urban propagation environments. The amount of intersymbol interference (ISI) due to the time dispersion distortion of the channel determines the method employed to produce acceptable BER performance. Methods considered to provide acceptable BER performance for a received signal during time dispersion distortion use non-coherent and coherent detectors, and a coherent detector in combination with a decision feedback equalizer (DFE). The scheme selected directly impacts the complexity of the receiver and acceptable BER performance.

The first detection method considered was a noncoherent limiter-discriminator with 1-symbol integration. Limiter-discriminator detection is possible due to the fact that the information content of the $\pi/4$ QPSK signal is in the phase shifts and not in the amplitude. Limiter-discriminator detection is the easiest method of implementing a $\pi/4$ QPSK detector since it uses familiar FM receiver technology.

The second method considered was a non-coherent delay detector. Detection is accomplished by multiplying the desired signal by a delayed version of itself. The delay detector requires a linear receiver to properly detect $\pi/4$ QPSK. This adds complexity to the receiver compared to the limiter-discriminator detector.

The third method considered was a coherent detector. This detector is based upon an open-loop approach. The coherent carrier is generated by quadrupling the modulated signal which produces spectral lines at $\frac{1}{2}$ the symbol rate. By multiplying the quadrupled signal by the $\frac{1}{2}$ symbol clock a coherent carrier is generated. The carrier is bandlimited and its phase angle is divided by 4 to generate the true carrier. A 90° phase ambiguity results due to the quadrupling and dividing process. The recovered carrier is then used to detect the baseband "I" and "Q" signals. The coherent detector is the most complex detector compared to the delay and limiter-discriminator since it requires a linear receiver and additional circuitry to extract the coherent carrier and to detect the incoming signal.

The fourth method considered was a maximum likelihood sequence estimation. While this method may be feasible to use, it was considered not practical because of the large amounts of processing time and space needed in a signal processor to carry out the distortion eliminating task.

The fifth method considered was a linear transversal equalizer (LTE). The LTE was found to be unstable since it takes an infinite number of coefficients to meet the TIA channel model specification for delay spread distortion in the received signal.

An adaptive decision feedback equalizer (DFE) provides a powerful means to reduce ISI produced by the time varying time dispersion channel which exhibit spectral null characteristics. The equalizer must operate adaptively to track the channel variations during a TDMA frame slot. Fast convergence algorithms are required to train and follow rapid channel variations. To obtain fast convergence, the family of more complex recursive least-squares (RLS) algorithms is used in order to update the (DFE) equalizer coefficients.

Bit error rate results have been investigated for the non-coherent and coherent detectors. Presently, problems exist which would not allow the limiter-discriminator or delay non-coherent detectors to meet the current TIA delay interval specification.

As stated above, the coherent detector is the most complex detector to produce, but is the most likely detector for which equalization methods may be used. Thus, there is a need for a coherent receiver detector using a DFE, operating at high data rates, that meets the TIA channel model specification for time dispersion distortion.

SUMMARY OF THE INVENTION

The foregoing needs are substantially met by an apparatus and method for substantially reducing distortion in a received signal. An equalizer, including taps having gain coefficients, produces an equalized signal responsive to the received signal and an adaptive process signal, wherein the gain coefficients are adjusted responsive to the adaptive process signal. A first mixer mixes the equalized signal and a reference carrier signal to produce a recovered modulated signal. A detector detects an estimate signal responsive to the recovered modulated signal. An error signal generator generates an error signal responsive to a difference between the recovered modulated signal and the estimate signal. A second mixer mixes the error signal and the reference carrier signal to produce the adaptive process signal. In a preferred embodiment, a third mixer mixes the estimate signal and the reference carrier signal to produce a feedback signal for at least one tap.

DETAILED DESCRIPTION OF A PREFERRED EMBODIMENT

The preferred embodiment of the present invention improves the performance of adaptive equalizers in radio signal channels having distortion. At high data rates, equalizer structures generally experience tracking difficulty in multipath and delay spread channels. Coupling carrier recovery information from the coherent recovery detector to the adaptive equalizer improves performance under both distorted channel conditions. It is a feature of the present invention that the carrier recovery information is coupled to the adaptive equalizer such that the equalizer function remains independent of the coherent recovery function. Independent coupling allows the equalizer to substantially eliminate the distortion without also having to perform coherent carrier recovery. Likewise, the coherent carrier recovery function can operate without also having to perform the equalizer function. The equalizer and coherent detector functions are optimized separately, but are also coupled to achieve optimum performance of the overall receiver operation.

Figure 1:
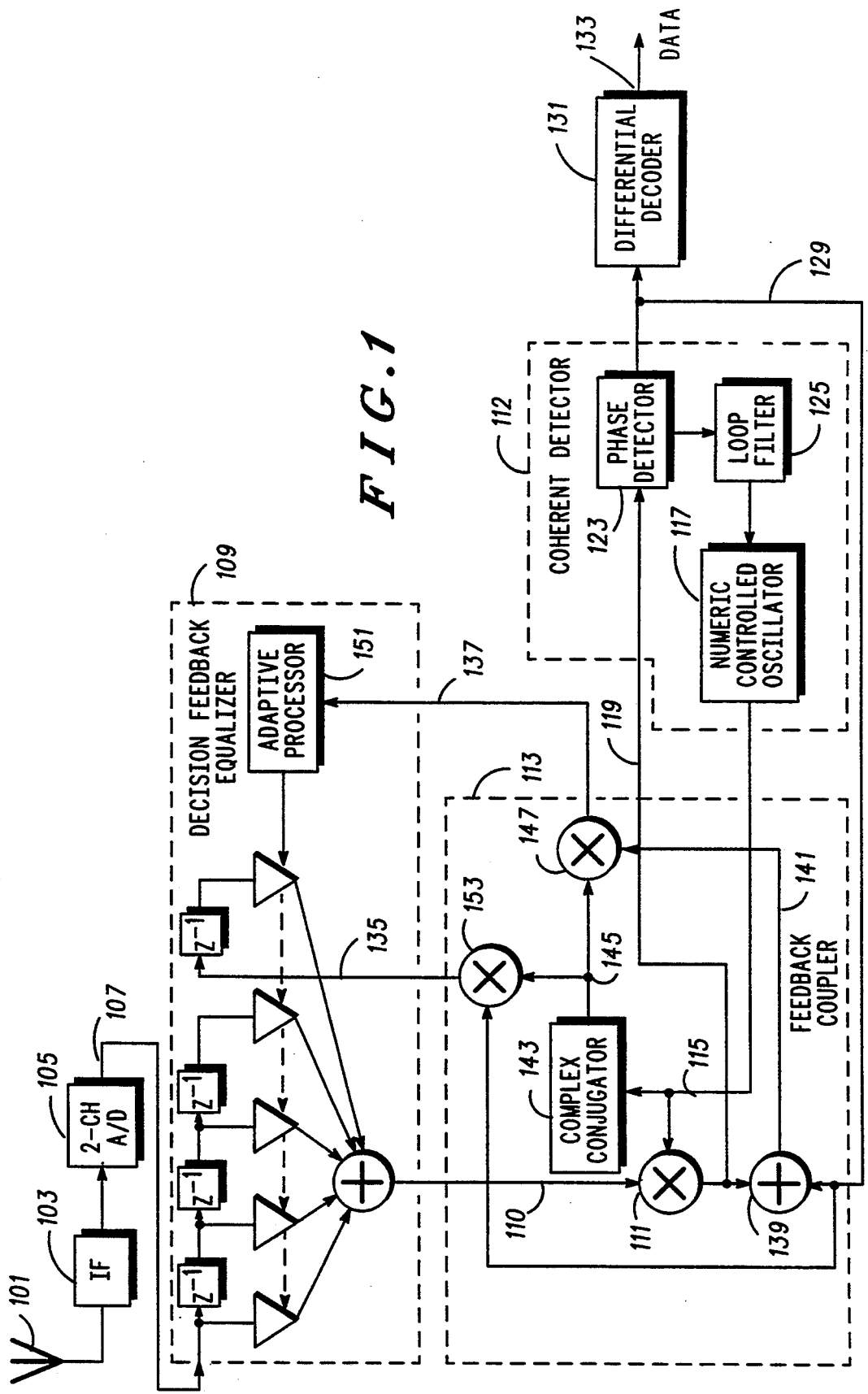
FIG. 1 is a block diagram of a TDMA receiver including a decision feedback equalizer, a feedback coupler and a coherent detector.

Now referring to FIG. 1, there is shown a receiver which includes the preferred embodiment of the present invention. A signal having distortion is received by an antenna 101. The received signal is processed through intermediate frequency (IF) filter 103 and further sampled by a two channel analog to digital converter 105. The sampled signal 107 is coupled to a conventional adaptive decision feedback equalizer (DFE) 109.

The adaptive DFE 109 structure is used to combat severe distortions introduced by the time dispersion of the received signal. The DFE provides a powerful means to reduce intersymbol interference (ISI) produced by the time varying delay spread channel which exhibits spectral null characteristics. The DFE must operate adaptively to track the channel variations during a TDMA time slot. Fast convergence processees are required to train and follow the rapid channel variations. To obtain fast convergence, a recursive least-squares (RLS) process is used in order to update the DFE coefficients. The DFE 109 produces an equalized output signal responsive to a feedback tap and an adaptive process input signals and the received input signal.

The equalized signal 110 from the DFE 109 is coupled to a mixer 111 in the feedback coupler 113. The equalized signal 110 is combined with a recovered carrier signal 115 from numeric controlled oscillator 117 to produce a recovered modulated signal 119. The recovered modulated signal 119 is now processed through a conventional coherent detector 112. The coherent detector 112 includes a phase detector 123, a loop filter 125, and a numeric controlled oscillator 117. The recovered modulated signal 119 is processed through the phase detector 123 to produce an estimated symbol signal 129. The estimated symbol signal 129 is further processed in a differential decoder 131 to produce a decoded data signal 133. A second output from the phase detector 123 is processed through a loop filter 125 and a numeric controlled oscillator 117 to produce the recovered carrier signal 115.

The feedback coupler 113 provides the structure for coupling carrier recovery information to the DFE feedback inputs 135 and 137. Carrier recovery information includes a recovered carrier signal 115 and an estimated symbol signal 129. The feedback coupler 113 also allows the DFE 109 and the coherent detector 112 to optimally perform their functions independently.

The recovered modulated signal 119 from mixer 111 is combined with the estimated symbol signal 129 in a summer 139 to produce an equalized error estimate signal 141. The recovered carrier signal 115 is coupled to a complex conjugator 143 to produce a conjugated recovered carrier signal 145. The purpose of the complex conjugator 143 is to generate a negative frequency correction signal from the recovered carrier signal 115 determined by the coherent detector 112. The conjugate recovered carrier signal 145 is combined with the equalized error estimate signal 141 in mixer 147 to produce the adaptive processor input signal 137. The adaptive processor input signal 137 is processed by the adaptive processor 151 in the DFE 109 using the RLS process to independently adjust multiple feedforward and feedback gain stages in the DFE 109.

The conjugated recovered carrier signal is also combined with the estimated symbol signal 129 in mixer 153 to produce a feedback tap input signal 135. The purpose of the feedback tap input signal is to aid in removal of intersymbol interference.

Thus, the feedback coupler structure 113 allows the equalized signal 110 to be coupled to the coherent detector 112 and allows carrier recovery information signals 115 and 129 to be coupled back to the DFE 109 to achieve optimal performance of both the DFE 109 and the coherent detector 112.

Figure 2:
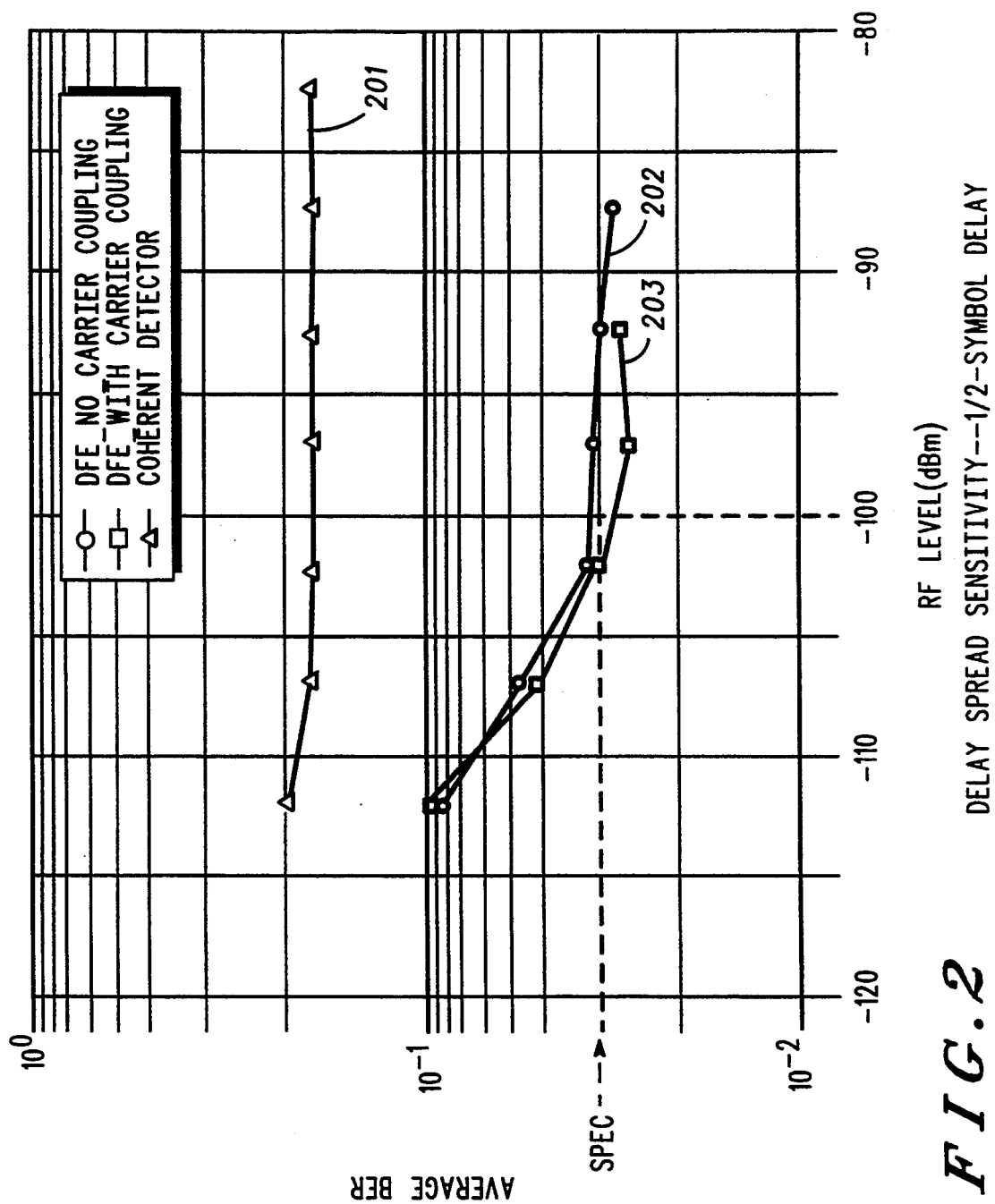
FIG. 2 is a graph describing the delay spread sensitivity of a received signal for three TDMA receiver structures.

Now referring to FIG. 2, there is shown a graph comparing delay spread sensitivity results using different equalizing and carrier recovery structures. The graph presents average BER in a logarithmic scale on the Y axis and radio frequency (RF) power level in a linear scale on the X axis. The dotted boundary in the lower left hand corner represents the TIA specification.

Measurements for the three curves were taken at 100 kilometers per hour of mobile unit vehicle speed.

Curve 201 represents the average BER over various RF power levels using only a coherent detector in the receiver. This structure does not meet the TIA specification. Curve 202 represents the average BER over various RF power levels using a DFE 109 and a coherent detector 112 without coupling carrier recovery information back to the DFE 109. The performance of the receiver structure used to derive curve 202 is greatly improved over the structure used to derive curve 201. This improved performance indicated the need for a DFE in the receiver structure to improve delay spread sensitivity. Curve 203 shows an average BER for various RF power levels using a DFE 109 and a coherent detector 112 with the carrier recovery information coupled back to the DFE 109. The receiver structure, representing a point on curve 203 within the dotted boundary, meets the required TIA specification of an average BER of 3 percent at a RF power level of −100 dBm.

Figure 3:
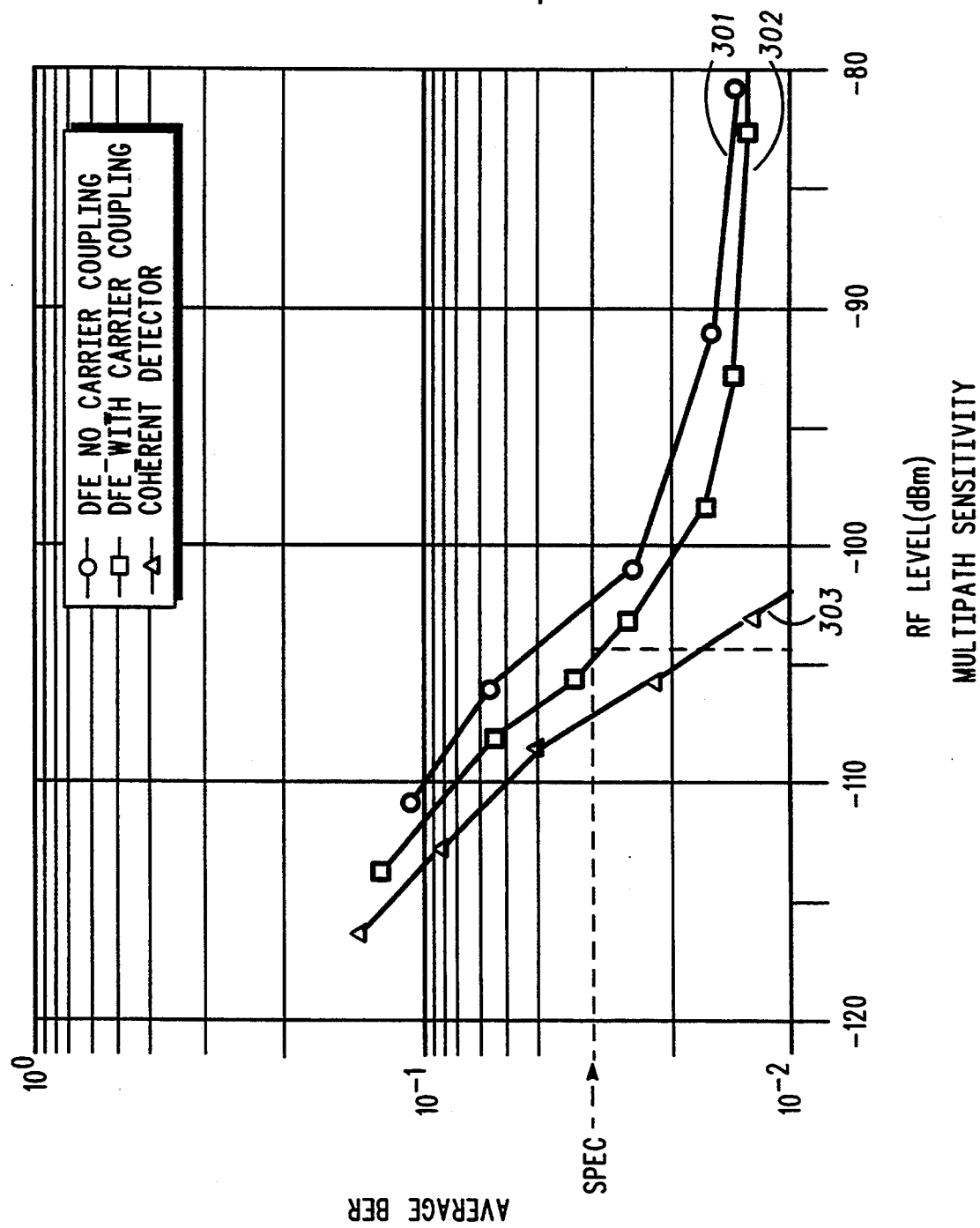
FIG. 3 is a graph describing the multipath sensitivity of a received signal for three TDMA receiver structures.

Now referring to FIG. 3, there is shown a graph representing multipath sensitivity for a received signal. Multipath distortion is characterized by many rays of the same signal having different energy levels reaching the receiver at the same time. The X and Y axis are labeled and scaled as shown in FIG. 2. The dotted boundary line in the lower left hand corner represents the TIA specification. Measurements for the three curves were taken at 100 kilometers per hour of mobile unit vehicle speed. Curve 301 represents an average BER rate for various RF power levels using the DFE 109 and a coherent detector 112 without coupling carrier recovery information back to the DFE 109. This structure does not meet the TIA specification. Curve 302 represents an average BER rate for various RF power levels using the DFE 109 and a coherent detector 112 with coupling the carrier recovery information from the coherent detector back to the DFE 109. The receiver structure with carrier coupling, as described in the preferred embodiment represented by curve 302 is an improvement over curve 301 which does not use carrier recovery coupling. Furthermore, a point on curve 302 falls within the TIA specification limit of an average BER of 3 percent for a RF power level of −103 dBm. Curve 303 represents an average BER rate for various RF power levels using only a coherent detector without a DFE. While curve 303 shows a great improvement in a multipath channel over a receiver structure including a DFE 109 with carrier recovery information coupled back to the DFE 109, the DFE 109 is needed for achieving the delay spread sensitivity specification.

Thus, the preferred embodiment of the present invention has described a receiver structure including a DFE and a coherent detector that meets the TIA channel model specification for time dispersion distortion and also an improvement in multipath distortion.

We claim:

1. In a receiver that receives an input signal to produce a received signal, an apparatus for substantially reducing distortion in the received signal comprising:

an equalizer, including taps having gain coefficients, for producing an equalized signal responsive to the received signal and an adaptive process signal, wherein the gain coefficients are adjusted responsive to the adaptive process signal;

a first mixer for mixing the equalized signal and a reference carrier signal to produce a recovered modulated signal;

a detector for detecting an estimate signal responsive to the recovered modulated signal;

an error signal generator for generating an error signal responsive to a difference between the recovered modulated signal and the estimate signal; and a second mixer for mixing the error signal and the reference carrier signal to produce the adaptive process signal.

2. An apparatus according to claim 1 further comprising a third mixer for mixing the estimate signal and the reference carrier signal to produce a feedback signal for at least one tap.

3. In a receiver that receives an input signal to produce a received signal, a method for substantially reducing distortion in the received signal comprising the steps of:

producing, in an equalizer including taps having gain coefficients, an equalized signal responsive to the received signal and an adaptive process signal, wherein the gain coefficients are adjusted responsive to the adaptive process signal;

mixing the equalized signal and a reference carrier signal to produce a recovered modulated signal;

detecting an estimate signal responsive to the recovered modulated signal;

generating an error signal responsive to a difference between the recovered modulated signal and the estimate signal; and mixing the error signal and the reference carrier signal to produce the adaptive process signal.

4. A method according to claim 3 further comprising the step of mixing the estimate signal and the reference carrier signal to produce a feedback signal for at least one tap.

5. A receiver comprising:

a frequency convertor for converting an input signal at a carrier frequency to a received signal at an intermediate frequency;

an equalizer, including taps having gain coefficients, for producing an equalized signal responsive to the received signal and an adaptive process signal, wherein the gain coefficients are adjusted responsive to the adaptive process signal;

a first mixer for mixing the equalized signal and a reference carrier signal to produce a recovered modulated signal;

a detector for detecting an estimate signal responsive to the recovered modulated signal;

an error signal generator for generating an error signal responsive to a difference between the recovered modulated signal and the estimate signal; and a second mixer for mixing the error signal and the reference carrier signal to produce the adaptive process signal; and a decoder for decoding the estimate signal to produce data.

6. A method for receiving comprising the steps of:

converting an input signal at a carrier frequency to a received signal at an intermediate frequency;

producing, in an equalizer including taps having gain coefficients, an equalized signal responsive to the received signal and an adaptive process signal, wherein the gain coefficients are adjusted responsive to the adaptive process signal;

mixing the equalized signal and a reference carrier signal to produce a recovered modulated signal;

detecting an estimate signal responsive to the recovered modulated signal;

generating an error signal responsive to a difference between the recovered modulated signal and the estimate signal; and mixing the error signal and the reference carrier signal to produce the adaptive process signal; and decoding the estimate signal to produce data.

* * * * *